United States Patent [19]

Tucholski et al.

[11] Patent Number: 4,975,341
[45] Date of Patent: Dec. 4, 1990

[54] ELECTROCHEMICAL CELL WITH CIRCUIT DISCONNECT DEVICE

[75] Inventors: Gary R. Tucholski, Parma Heights; Christopher S. Pedicini, North Olmsted, both of Ohio

[73] Assignee: Eveready Battery Company, Inc., St. Louis, Mo.

[21] Appl. No.: 516,365

[22] Filed: Apr. 3, 1990

[51] Int. Cl.$^5$ ............................................. H01M 10/50
[52] U.S. Cl. ......................................... 429/62; 429/54
[58] Field of Search ................. 429/62, 61, 57, 7, 122, 429/54

[56] References Cited

U.S. PATENT DOCUMENTS

| | | | |
|---|---|---|---|
| 4,011,366 | 3/1977 | Bones et al. | 429/61 |
| 4,035,552 | 7/1977 | Epstein | 429/62 X |
| 4,855,195 | 8/1989 | Georgopoulos et al. | 429/54 |

FOREIGN PATENT DOCUMENTS

| | | |
|---|---|---|
| 59-191273 | 10/1984 | Japan . |
| 59-203376 | 11/1984 | Japan . |
| 63-072062 | 1/1988 | Japan . |
| 63-175345 | 7/1988 | Japan . |

Primary Examiner—Anthony Skapars
Attorney, Agent, or Firm—Virgil B. Hill

[57] ABSTRACT

The invention relates to an electrochemical cell employing a resettable or nonresettable safety disconnect device operable by a shape memory alloy element. The shape memory alloy element is preferably in the form of an accordion or coiled configuration that will be extended in normal operation of the cell and contract when the internal temperature exceeds a preselected value whereupon the shape memory alloy will break contact in the electrical circuit of the cell thereby rendering the cell inoperative.

20 Claims, 2 Drawing Sheets

ELECTROCHEMICAL CELL WITH CIRCUIT DISCONNECT DEVICE

FIELD OF THE INVENTION

The invention relates to an electrochemical cell employing a safety disconnect device operable by a resettable or nonresettable shape memory alloy element.

BACKGROUND OF THE INVENTION

Under abuse conditions, high energy density electrochemical cells can leak or rupture which can cause damage to the device employing the cell or to people using the device. Examples of abuse conditions for a cell are abuse charging of the cell, forced discharging and external shorting. Such conditions cause the internal temperature of the cell to rise with a corresponding increase in pressure. Although such cells typically employ a venting mechanism wherein the electrolyte is expelled, the electrolyte can itself cause damage. Additionally, in cells which employ lithium as an anode material, if internal cell temperatures reach above 180° C., the lithium can melt and result in a fire. Therefore, safety devices other than venting means which will disconnect the electrical circuit under abuse conditions are desirable. If the circuit can be disconnected, the rise in the cell's internal temperature as a result of the abuse conditions can be terminated.

One method of interrupting the flow of electrical current in the cell when the internal temperature of the cell rises is to employ a PolySwitch disc, tradename of Raychem Corp., in the cell. Such a disc is a resettable device which, when a threshold temperature is reached, will inhibit the flow of electrical current in the cell. When the temperature is lowered, the disc will allow the normal available current in the electrical circuit to be restored. Unfortunately, these devices are not suitable for all applications. For example, when the PolySwitch disc is designed to function at low temperatures, the disc may have a low breakdown voltage. Once the breakdown voltage is reached, the disc no longer inhibits the current flow. Therefore, if cells containing these discs are used in a multicell device, and abuse conditions are experienced, the breakdown voltage would be reached and the PolySwitch disc would not inhibit the current flow.

In Japanese Patent Publication No. 59-191273, a memory alloy terminal lead is employed in a lithium/thionyl chloride cell. When the internal temperature of the cell rises, the alloy lead wire folds down to break the electrical circuit. When the temperature falls, the lead wire returns to its original shape, restoring the contact.

In Japanese Patent Publication No. 59-203376 a memory alloy terminal wire is employed in a lithium/thionyl chloride cell to connect the negative or positive electrode to a terminal on the cell housing. The memory alloy terminal wire operates such that as the cell is overheated, the wire will deflect from contact with the terminal and then return to contact the terminal when the temperature within the cell is decreased.

In Japanese Patent No. 63-72062 a shape memory alloy is placed between a terminal plate and a sealing body of a cell so that the sealing body is broken, thereby venting the cell, when the temperature of the cell exceeds the transformation temperature of the shape memory alloy.

U.S. Pat. No. 4,855,195 discloses electrochemical cells that employ a current collector-safety switch member comprised of a shape memory alloy in the electric circuit in the cell. The collector-safety switch member has a base portion and a plurality of legs extended therefrom and when the internal temperature of the cell rises, the legs of the collector-safety switch member are retracted to thereby disconnect the electrical circuit in the cell. These cells can also be comprised of a resettable thermal switch for inhibiting the flow of current in the cell at a temperature below the disconnect temperature of the current collector-safety switch member.

It is an object of the present invention to provide a safety circuit disconnect device for use in electrochemical cells.

It is another object of the present invention to provide a safety circuit disconnect device that can operate reliably when a cell employing the device is subjected to abuse conditions which increase the temperature within the cell above a predetermined level.

It is another object of the present invention to provide a resettable circuit disconnect device that employs a shape memory alloy twisted wire that is easy to produce and cost effective to assemble in the cell.

The foregoing and additional objects will become fully apparent from the following description and the accompanying drawings.

DISCLOSURE OF THE INVENTION

The invention relates to an electrochemical cell comprising an electrode assembly containing at least one positive electrode and at least one negative electrode; a housing containing the electrode assembly and containing first means for providing a terminal on the housing for one of the electrodes; a cover for the housing and an insulating member for insulating the cover from the housing; second means within the housing for providing a terminal on the cover for the opposite electrode; one of said first and second means being a current collector assembly comprising a conductive member electronically contacting one of electrodes; a conductive shape memory alloy member formed to be in an extended configuration at and below a predetermined temperature and adapted to contract when exposed to a temperature above said predetermined temperature, said conductive shape memory alloy member electronically connected at one end to the terminal on the housing or cover and electronically connected at the other end to the conductive member thereby electronically connecting one of said electrodes to the terminal on the housing or cover; and wherein said conductive shape memory alloy member is adapted to contract when the temperature within the cell exceeds said predetermined temperature thereby breaking the electronic contact between the one of said electrodes and the terminal on the housing or cover.

The conductive shape memory alloy member used in this invention is an alloy material that can be formed into a desired shape at room temperature, and when heated, return to its original shape or a formed shape different from the first desired shape. The alloy need not itself be resettable. A resettable alloy is one that when exposed to heat will assume a different shape and upon cooling will return to its original shape without external force. A nonresettable alloy is one that when exposed to heat will assume a different shape but upon cooling will not return to its original shape. At temperatures below the transformation temperature of the shape memory alloy of this invention, the circuit remains unbroken because the shape memory alloy will be extended so as to electronically contact a terminal of the cell to one of the electrodes of the cell. When the transformation temperature of the shape memory alloy is exceeded, the shape memory alloy will contract and change its shape thereby breaking the electronic contact between the electrode and the terminal of the cell. When using resettable shape memory alloys, then upon cooling, the shape memory alloy member returns to its original shape, thereby restoring electronic contact between the terminal and the electrode. Thus the circuit disconnect device of this invention is resettable when employing a resettable shape memory alloy and is nonresettable when employing a nonresettable shape memory alloy.

Examples of alloys which exhibit shape memory characteristics are nickel-titanium alloys, copper-zinc-aluminum alloys, and aluminum-copper-silicon alloys. Most preferred for use in this invention are nickel-titanium alloys.

The preferable shape memory alloy member for use in this invention would be in the shape of a wire such that when exposed to a high temperature environment, the wire will be able to contract thereby breaking contact with the terminal of the cell or the electrode via the conductive member. In a bent or accordion configuration at room temperature, the shape memory alloy wire would be smaller in length or height than the longitudinal length of the wire if it were extended in a straight length. However, the wire would be formed into a desired shape at room temperature and when heated, change its shape to a contracted form that will pull one end of the wire away from the terminal of the cell or the conductive member. If the wire is made of a resettable shape memory alloy, then upon cooling, the shape memory alloy member would expand in length or be extended to its original shape such that it would return to its original position, restoring the electronic contact between the current collector assembly and the terminal.

In the preferred embodiment, one end of the conductive shape memory alloy would be electronically connected to the cover and the other end electronically connected to an electrode via the conductive member. Preferably, the end of the shape memory alloy connected to the cover would be permanently secured to the cover while the opposite end of the shape memory alloy would make pressure contact to the conductive member. In this embodiment, when the cell's internal temperature exceeds a predetermined level, the shape memory alloy would contract in length and break contact with the conductive member thereby breaking contact between the electrode and the terminal (cover) of the cell. In another embodiment, the shape memory alloy could be permanently secured to the conductive member at one end and the other end could make pressure contact with the cover terminal. In this embodiment, when the cell's internal temperature exceeds a predetermined level, the shape memory alloy would contract in length and break contact with the cover terminal thereby breaking contact between the electrode and the terminal (cover) of the cell.

In another embodiment, the shape memory alloy could be electronically connected to the housing terminal at one end and at the other end to a conductive member making contact to one of the electrodes. The shape memory alloy could be permanently secured at one end to either the housing terminal or the conductive member and at the other end it could be in pressure contact with either the conductive member or housing terminal, respectively In either embodiment, the shape memory alloy would contract when exposed to a temperature within the cell above a preselected level and thereby break contact between the electrode and the housing terminal.

In a most preferred embodiment the current collector assembly would comprise an elongated conductive container, closed at one end, disposed within the cell and having an open end terminating with an extending flange. Disposed within the container would be an extended shape memory alloy member insulated from the container by an insulator member except for an exposed area where the shape memory alloy would electronically contact the container. The insulator member could extend adjacent the internal wall of the container and over the extending flange of the container thereby insuring that the container is also insulated from the cover terminal of the cell. The end of the shape memory alloy that is opposite to the end electronically connected to the cover terminal is in pressure contact with the exposed area of the container. Thus the electrode in electronic contact with the container is electronically connected to the cover terminal via the shape memory alloy. When the heat within the cell exceeds a predetermined level, the shape memory alloy will contract and pull away from electronic contact with the container thereby breaking contact between the electrode and the cover terminal. If the shape memory alloy is resettable, then upon cooling, the shape memory alloy will extend and again electronically contact the container thereby restoring electronic contact between the cover terminal and the electrode. In this embodiment, the shape memory alloy could be formed into an accordion configuration, a coiled configuration, or any similar shaped configuration such that when heated the shape memory alloy would contract to break electronic contact between a terminal and an electrode.

The electrochemical cells of this invention employ a current collector assembly performing two functions. The first function is collecting the current from an electrode and transferring it to the terminal. The second is a safety function wherein the electrical contact between the electrode and terminal is broken when the internal temperature of the cell rises.

The current collector assembly preferably disconnects the electrical circuit at a temperature below the temperature at which the components of the cell melt or below the temperature at which the internal pressure of the cell becomes large enough to rupture the cell container. If a vent means is employed, the member preferably disconnects the electrical circuit below a temperature at which the internal pressure is sufficient to activate the vent. This temperature can vary according to cell systems. For cell systems which employ lithium as the anode, the current collector assembly preferably disconnects the electrical circuit below the temperature at which the lithium will melt. Most preferably, the disconnect temperature of the current collector assembly is between about 85° C. and about 95° C.

Any combination of positive and negative electrodes suitable to provide an electrical circuit in the cell can be used in the cells of this invention. Examples of suitable combinations are a stacked assembly, plate assembly, and spirally wound assembly.

The electrode assembly used in the cells of this invention is preferably a spirally wound electrode assembly. Typically, such an assembly has a negative electrode strip comprising an anode material and a positive electrode strip comprising a cathode material separated by a separator strip. Useful anode materials are consumable metals, such as aluminum, zinc, the alkali metals, alkaline earth metals, and alloys of alkali metals and alkaline earth metals. Preferred anode materials for nonaqueous electrolyte systems include aluminum, lithium, sodium, and calcium. Preferably, the anode material for such systems is lithium because it is a ductile soft metal and possesses the highest energy-to-weight ratio of the group of suitable anode metals. Lithium can be utilized as a strip or can be applied to a suitable carrier. After being formed into the strip, the electrode will typically have an anode collector portion extending on one edge of the strip.

Suitable active cathode materials are electrochemically reducible materials. Such materials include natural or synthetic iron sulfides such as $FeS_2$ and $FeS$, manganese oxides such as $MnO_2$, carbon fluorides such as $(CF_x)n$ or $(C_2F)_n$, $V_2O_5$, $WO_3$, $MoO_3$, $MoS_2$, lead oxides, cobalt oxides, copper oxides, copper sulfides, $In_2S_3$, $NiS$, $Ag_2CrO_4$, $Ag_3PO_4$, transition metal sulfides such as $TiS_2$, transition metal polysulfides, and mixtures thereof. By "active cathode" is meant the material being reduced in the electrochemical reaction. The active cathode material is formed into the positive electrode by mixing the active cathode material with an amount of a suitable conductive material such as carbon and an amount of a suitable binder. The mixture can then be formed into a strip material or pressed, impregnated or coated onto a suitable carrier such as foil or expanded metal. After being formed into the strip, the electrode will typically have a cathode collector portion extending on one edge of the strip.

Separator materials useful in this invention are materials which are electrically nonconductive but ionically conductive and are porous to allow the electrolyte to contact both electrodes. Examples of suitable separator materials are paper, polypropylene and polyethylene.

The spirally wound electrode assembly can be prepared by winding the separators, negative electrode, and positive electrode together so that the cathode collector protrudes from one end of the assembly while the anode collector extends from the other end of the assembly.

Suitable electrolytes for use in the cells of this invention can be aqueous or nonaqueous. Nonaqueous electrolytes can employ organic or inorganic solvents containing a conductive solute. Suitable solvents include tetrahydrofuran (THF), dioxolane, dimethoxyethane (DME), dimethyl isoxazole (DMI), 3-methyl-2-oxazolidone, diethyl carbonate (DEC), propylene carbonate, ethylene glycol sulfite (EGS), dioxane, dimethyl sulfite (DMS), or the like and mixtures thereof.

Suitable salts include: $MCF_3SO_3$, $MSCN$, $MBF_4$, $MClO_4$ and $MM'F_6$ wherein M is lithium, sodium or potassium, and M' is phosphorus, arsenic or antimony. The particular salt selected is compatible and non-reactive with the solvent and the electrodes of the cell. The amount of salt to be added to the solvent should be sufficient to provide an ionically conductive solution with a conductivity of at least about $10^{-4} ohm^{-1} cm^{-1}$. Typically, about 0.5 M of the salt will be sufficient. An example of a preferred electrolyte is a mixture of dioxolane, propylene carbonate, and dimethoxyethane, and $LiClO_4$.

The housing of the cells of this invention may be comprised of an electrically conductive material such as metal or a plastic substrate coated with a metal. The housing contains a means for providing a terminal for one of the electrodes. Preferably, the housing has an open end and a closed end and is cylindrical. The housing itself can contact one of the electrodes to provide a terminal.

The cover assembly also contains a means for providing the terminal opposite in polarity from the terminal provided by the housing. Preferably, the cover assembly further comprises a means for sealing and insulating the cover assembly from the cell housing and a seal-vent assembly including a means for venting the cell.

Examples of suitable venting means in the seal-vent assembly include providing an orifice in the assembly to provide a path from the interior of the cell to the exterior of the cell. This orifice can then be closed with a sealing plug which will melt at a temperature or will be expelled at a pressure suitable to allow the internal components of the cell to escape. Another suitable venting means is coining or etching a design in the assembly to provide weakened areas which could be blown out under increased cell pressure. A preferred vent means has a seal-vent assembly having a venting well providing a means for venting the cell. Such a means is preferably provided by employing a vent orifice in the bottom of the venting well and inserting a vent sealing member in the venting well over the orifice. Such a desirable vent means is disclosed in U.S. patent application Ser. No. 102,814 which is incorporated herein in its entirety as if fully recited.

In a preferred embodiment the cells are assembled by forming the electrode assembly and inserting the assembly into a housing having a closed end and an open end, so that one of the electrodes is in contact with the housing. After placing the electrode assembly in the cell, the electrolyte is added and the cover assembly is placed over the open end of the housing.

The present invention will become more apparent from the following description thereof when considered together with the accompanying drawing which is set forth as being exemplary of embodiments of the present invention and is not intended in any way to be limitative thereof.

DESCRIPTION OF THE PREFERRED EMBODIMENTS

Figure 1:
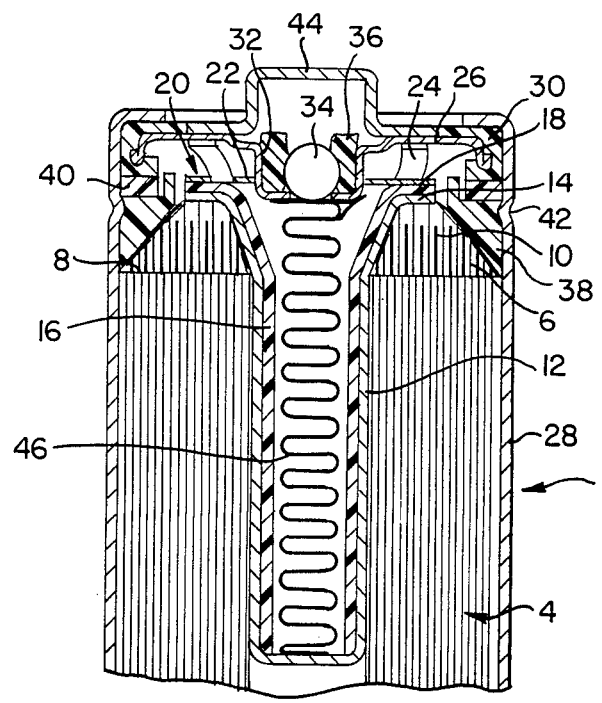
FIG. 1 is a vertical cross-sectional view of the upper portion of an electrochemical cell made in accordance with the present invention and employing a spirally wound electrode assembly and a shape memory alloy found in an accordion type configuration.

Referring to FIG. 1, an electrochemical cell 2 is shown having a spirally wound electrode assembly 4 prepared by superimposing and overlapping a first electrode strip 6 onto a second electrode strip 8 with an insulating separator 10 extending between the edges of electrode strip 6 and electrode strip 8. The edges of electrode strip 6 extend at the top end of the cell 2 to contact inner disposed conductive container 12 at its extended flange 14. Insulator member 16 is disposed on the inner wall of container 12 and extends with a flange 18 disposed on top of flange 14 of container 12. Disposed on top of insulator flange 18 is a conductive member 20 preferably made of a spring material, having a base portion 22 in contact with flange 18 and having upwardly extending legs 24 contacting a conductive cover 26. Conductive cover 26 is sealed to the cell's container 28 and insulated from container 28 by gasket 30. The cover 26 has a well 32 to accommodate a seal-vent member 34. A lining 36 is disposed between well 32 and seal-vent member 34. This cell is assembled by placing the spirally wound electrode assembly 4 into the conductive container 28. An insulating cone 38 is then placed on top of the spirally wound electrode assembly 4 followed by a ring support 40 placed on cone 38 above a bead 42 in the container 28. As stated above, insulating gasket 30 is employed to provide a fluid- and gas-tight seal for the cell. A terminal member 44 is placed on top of the conductive cover 26 to serve as a terminal for electrode strip 6. Disposed within inner container 12 and insulated from the inner upstanding wall of container 12 by insulator 16 is a shape memory alloy member 46 formed in the configuration of an accordion or a coil. One end of shape memory alloy member 46 is in electronic contact with cover 26 while the opposite end is in electronic contact with the base of conductive container 12. In this arrangement, terminal 44 is electronically connected to electrode 6 via cover 26 which in turn is electronically connected to shape memory alloy member 46 which in turn is electronically connected to container 12 and then container 12 is in electronic contact with electrode 6. Shape memory alloy member 46 is formed so that it will contract when subjected to heat and could be made of a resettable or nonresettable material. The shape memory alloy member 46 should preferably contract when exposed to a preselected temperature, e.g. above 90° C.

Figure 2:
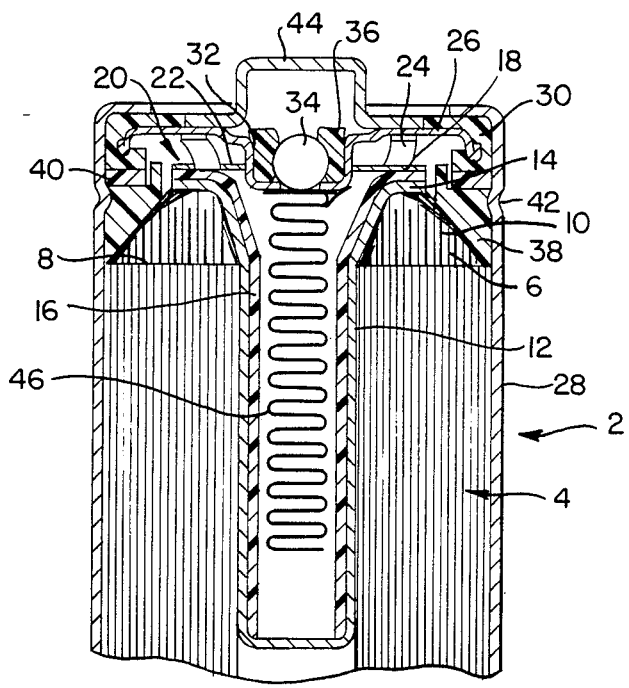
FIG. 2 is a vertical cross-sectional view of the cell in FIG. 1 after the cell is exposed to an excessive internal temperature rise.

Although not shown, electrode strip 8 extends at the bottom of the cell and electronically contacts the cell's container 28 thereby adapting the container 28 as the terminal for electrode strip 8. In the arrangement of FIG. 1, an operable cell is shown which can be used to power a device. FIG. 2 shows the electrochemical cell of FIG. 1 and has the same components identified with the same reference numbers. FIG. 2 shows the cell after the internal temperature rise exceeds a predetermined level so that the shape memory alloy member 46 contracts and results in the electronic contact between container 12 and cover 26 being broken. If the shape memory alloy member 46 is resettable, then upon cooling, the shape memory alloy member 46 will extend to its original extended shape and contact container 12 thereby electronically connecting electrode strip 6 to terminal 44 via cover 26. As stated earlier, the shape memory alloy can be nonresettable so that once it is contracted, it will remain contracted thereby preventing the reconnection of electrode strip 6 to cover 26 and terminal 44.

Figure 3:
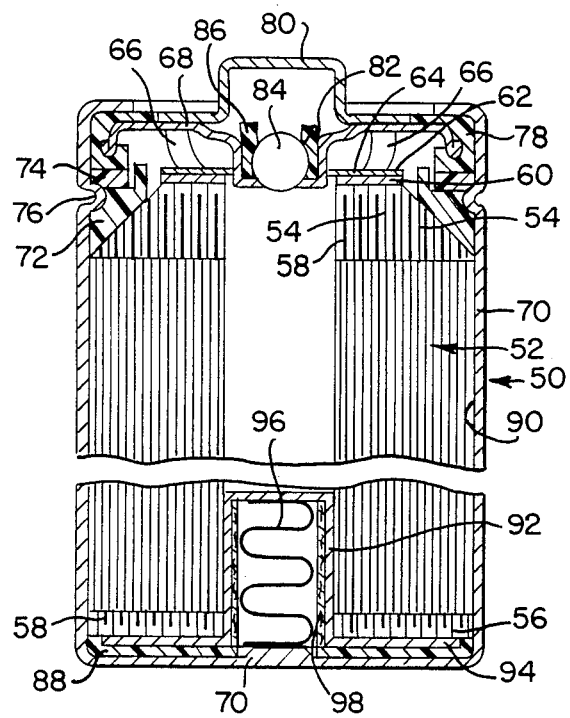
FIG. 3 is a vertical cross-sectional view of another embodiment of an electrochemical cell made in accordance with the present invention and employing a spirally wound electrode assembly and a shape memory alloy in an accordion type configuration.

FIG. 3 shows an electrochemical cell 50 having a spirally wound electrode assembly 52 prepared by superimposing and overlapping a first electrode strip 54 onto a second electrode strip 56 with an insulating separator 58 between electrode strip 54 and electrode strip 56. The edges of electrode strip 54 extend at the top end of cell 50 to contact conductive ring 60. Disposed on top of conductive ring 60 is a conductive member 62, preferably made of a spring material, having a base portion 64 in contact with ring 60 and having upwardly extending legs 66 contacting a conductive cover 68. The cell is assembled by placing the spirally wound electrode assembly 52 into conductive container 70. An insulating cone 72 is then placed on top of the spirally wound electrode assembly 52 followed by a ring support 74 placed on cone 72 above a bead 76 in the container 70. An insulating gasket 78 is employed to provide a fluid- and air-tight seal between cover 68 and container 70. A terminal member 80 is placed on top of conductive cover 68 to serve as a terminal for electrode strip 54. In this arrangement electrode strip 54 is in electronic contact with terminal member 80 via conductive ring 60, conductive member 62 and conductive cover 68 thereby adopting terminal member 80 as the terminal for electrode strip 54. Cover 68 has a well 82 to accommodate a seal-vent member 84. A lining 86 is disposed between well 82 and seal-vent member 84.

Disposed at the bottom of container 70 is an insulating ring 88 which together with an insulating vertical enclosure 90 electronically isolates electrode strip 56 from the container. A conductive member 92 has an extended flange 94 which rests on insulating ring 88. The edges of electrode strip 56 extend at the bottom and electronically contact flange 94 of conductive member 92. A conductive shape memory alloy member 96, formed into an accordion or coiled configuration, has one end secured to conductive member 92 and its opposite end electronically secured to conductive container 70. Conductive member 92, insulating ring 88, insulating member 98, and shape memory alloy member 96 are assembled in cell container 70 prior to the insertion of electrode assembly 52. Disposed against the inner upstanding wall of conductive member 92 is an insulating member 98 to prevent the conductive shape memory alloy member 96 from contacting the upstanding wall of conductive member 92 when the temperature rise exceeds a predetermined level at which time the electric circuit of the cell should be maintained broken. Insulating member 98 could form part of insulating ring 88 if desired.

In the embodiment shown in FIG. 3, electrode strip 56 is electronically connected to container 70 via conductive member 94 and conductive shape memory alloy member 96 thereby adapting the container 70 as the terminal for electrode strip 56. Shape memory alloy member 96 is formed so that it will contract when subjected to heat and could be made of a resettable or nonresettable material. The shape memory alloy member 96 will contract when exposed to a preselected temperature, e.g. above 90° C.

Figure 4:
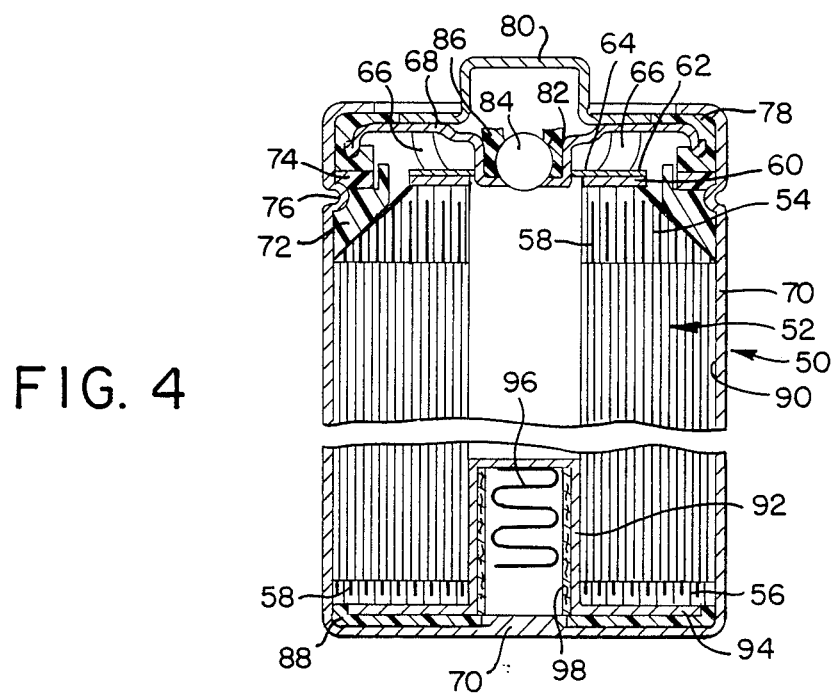
FIG. 4 is a vertical cross-sectional view of the cell in FIG. 3 after the cell is exposed to an excessive internal temperature rise.

FIG. 4 shows the electrochemical cell of FIG. 3 and has the same components identified with the same reference numbers. FIG. 4 shows the cell 50 after the internal temperature rise exceeds a predetermined level so that the shape memory alloy member 96 contracts and results in the electronic contact between container 70 and electrode strip 56 being broken. If the shape memory alloy member 96 is resettable, then upon cooling, the shape memory alloy member 96 will return to its original extended form and contact container 70 thereby electronically connecting electrode strip 56 to container 70. As stated earlier, the shape memory alloy can be nonresettable so that once it is contracted, it will remain contracted thereby preventing the reconnection of electrode strip 56 to container 70.

The embodiments shown in FIGS. 1 through 4 illustrate examples of a resettable or nonresettable disconnect device for electrochemical cells in accordance with this invention. The device of this invention will preferably interrupt the cell's circuit prior to venting of the cell or rupture of the cell's housing.

It is to be understood that although the present invention has been described with reference to many particular details thereof, it is not intended that these details shall be construed as limiting the scope of this invention. For example, as stated above, the shape memory alloy member of the embodiment shown in FIGS. 1 and 2 could be secured to the cover and in pressure contact with conductive container 12 or secured to the conductive container 12 and in pressure contact with the cover. The term cover is used to mean the cover or a member electronically connected to the cover so that the end of the shape memory alloy member would be permanently secured to the cover directly or via a conductive member. If desired, the shape memory alloy member could also be in pressure contact with both the cover and the conductive container 12 so that upon being heated, it would break electronic contact with at least one of these components. The shape memory alloy member of the embodiment shown in FIGS. 3 and 4 could be secured to the housing and in pressure contact with the conductive member 94 or secured to conductive member 94 and in pressure contact with the housing. The term housing is used to mean the housing or a member electronically connected to the housing so that the end of the shape memory alloy member would be permanently secured to the housing directly or via a conductive member. If desired, the shape memory alloy member could also be in pressure contact with both the housing and the conductive member 94 so that upon being heated, it would break electronic contact with at least one of these components.

What is claimed:

1. An electrochemical cell comprising an electrode assembly containing at least one positive electrode and at least one negative electrode; a housing containing the electrode assembly and containing first means for providing a terminal on the housing for one of the said positive and negative electrodes; a cover for the housing and an insulating member for insulating the cover from the housing; second means within the housing for providing a terminal on the cover for the opposite electrode; one of said first and second means being a current collector assembly comprising a conductive member electronically contacting one of electrodes; a conductive shape memory alloy member formed to be in an extended configuration at and below a predetermined temperature and adapted to contract when exposed to a temperature above said predetermined temperature, said conductive shape memory alloy member electronically connected at one end to the terminal on the housing or cover and electronically connected at the other end to the conductive member thereby electronically connecting one of said electrodes to the terminal on the housing or cover; and wherein said conductive shape memory alloy member is adapted to contract when the temperature within the cell exceeds said predetermined temperature thereby breaking the electronic contact between the one of said electrodes and the terminal on the housing or cover.

2. The electrochemical cell of claim 1 wherein the shape memory alloy member has an accordion configuration.

3. The electrochemical cell of claim 1 wherein the conductive member of the current collector assembly in electronically connected to the cover.

4. The electrochemical cell of claim 3 wherein the shape memory alloy member at one end is secured to and is electronically connected with the cover and at the opposite end it is in pressure contact with the conductive member of the current collector assembly so that when the temperature within the cell exceeds said predetermined temperature the shape memory alloy member will contract and break the electronic connection to the conductive member 5. The electrochemical cell of claim 3 wherein the shape memory alloy member at one end is secured to and is electronically connected with the conductive member of the current collector assembly and at the opposite end it is in pressure contact with the cover so that when the temperature within the cell exceeds said predetermined temperature the shape memory alloy member will contract and break the electronic connection to the cover.

6. The electrochemical cell of claim 3 wherein the shape memory alloy member is resettable.

7. The electrochemical cell of claim 3 wherein the shape memory alloy member is nonresettable.

8. The electrochemical cell of claim 1 wherein the conductive member of the current collector assembly is electronically connected to the housing.

9. The electrochemical cell of claim 8 wherein the shape memory alloy member at one end is secured to and is electronically connected with the housing and at the opposite end it is in pressure contact with the conductive member of the current collector assembly so that when the temperature within the cell exceeds said predetermined temperature the shape memory alloy member will contract and break the electronic connection to the conductive member.

10. The electrochemical cell of claim 8 wherein the shape memory alloy member at one end is secured to and is electronically connected with the conductive member of the current collector assembly and at the opposite end it is in pressure contact with the housing so that when the temperature within the cell exceeds said predetermined temperature the shape memory alloy member will contract and break the electronic connection to the housing.

11. The electrochemical cell of claim 8 wherein the shape memory alloy member is resettable.

12. The electrochemical cell of claim 8 wherein the shape memory alloy member is nonresettable.

13. The electrochemical cell of claim 1 wherein one electrode comprises lithium and the other electrode comprises iron sulfide.

14. The electrochemical cell of claim 1 wherein one electrode comprises lithium and the other electrode comprises a member of the group consisting of $MnO_2$, carbon fluoride and mixtures thereof.

15. The electrochemical cell of claim 1 wherein the shape memory alloy is selected from the group consisting of nickel-titanium alloys, copper-zinc-aluminum alloys, and aluminum-copper-silicon alloys.

16. The electrochemical cell of claim 15 wherein the shape memory alloy is nickel-titanium alloy.

17. The electrochemical cell of claim 16 wherein the shape memory alloy member has a shaped configuration selected from the group consisting of coiled shaped and accordion shaped configuration.

18. The electrochemical cell of claim 16 wherein one electrode comprises lithium and the other electrode comprises iron sulfide.

19. The electrochemical cell of claim 16 wherein one electrode comprises lithium and the other electrode comprises a member of the group consisting of $MnO_2$, carbon fluoride and mixtures thereof.

20. The electrochemical cell of claim 18 wherein the conductive member of the current collector assembly is electronically connected to the cover.

* * * * *